United States Patent [19]
Sakamaki

[11] Patent Number: 6,070,484
[45] Date of Patent: Jun. 6, 2000

[54] MOLD TYPE PLASTIC GEAR

[75] Inventor: Kazuyuki Sakamaki, Kawaguchi, Japan

[73] Assignee: Enplas Corporation, Saitama, Japan

[21] Appl. No.: 09/054,256

[22] Filed: Apr. 2, 1998

[51] Int. Cl.$^7$ .............................. B29D 15/00; F16H 55/00
[52] U.S. Cl. ................... 74/434; 74/DIG. 10; 264/328.1
[58] Field of Search .............................. 74/434, DIG. 10; 264/328.1, 328.12, 328.8

[56] References Cited

U.S. PATENT DOCUMENTS

| | | | |
|---|---|---|---|
| 4,793,659 | 12/1988 | Oleff et al. ............................ | 264/328.8 |
| 5,254,304 | 10/1993 | Adachi et al. ....................... | 264/328.12 |

FOREIGN PATENT DOCUMENTS

| | | | |
|---|---|---|---|
| 2 698 945 | 6/1994 | France ................................ | 74/DIG. 10 |
| 58-81137 | 5/1983 | Japan ................................. | 264/328.12 |
| 58-217850 | 12/1983 | Japan ................................. | 74/DIG. 10 |
| 8-25501 | 1/1996 | Japan . | |
| 2 126 686 | 3/1984 | United Kingdom .................... | 74/434 |

OTHER PUBLICATIONS

Edward M. Hagerman, Weld–line Fracture in Molded Parts, Plastics Engineering, pp. 67–69, Oct. 1973.

*Primary Examiner*—David A. Bucci
*Assistant Examiner*—William C Joyce
*Attorney, Agent, or Firm*—Koda & Androlia

[57] ABSTRACT

A molded plastic circular gear which has removed its wall portions on the inside of a tooth root of its circumferential gear teeth portion. The gear has a circular rim formed at a distance from and on an inside of the tooth root. The gear is further formed by injection of resin through gates located in the web portion of the inside of the rim. The gear is further characterized in that the thickness in the axial direction of the web portion of the inside of the rim is made larger than that of the web portion on the outside of the rim.

4 Claims, 2 Drawing Sheets

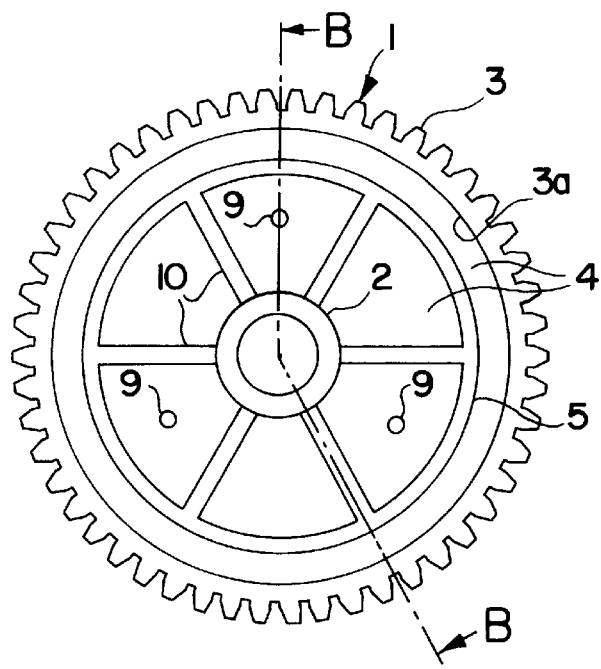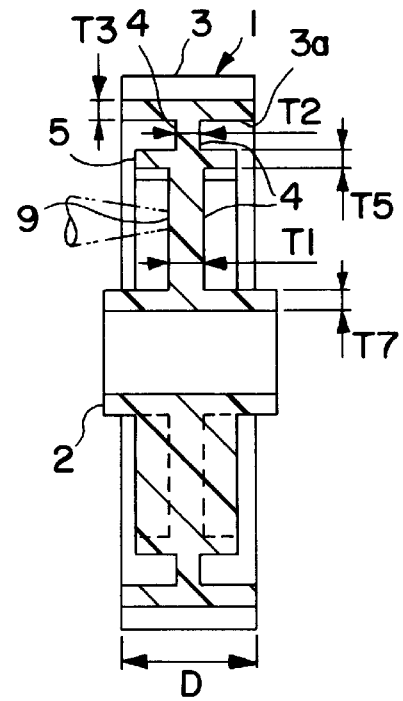
FIG. 2(a)  FIG. 2(b)
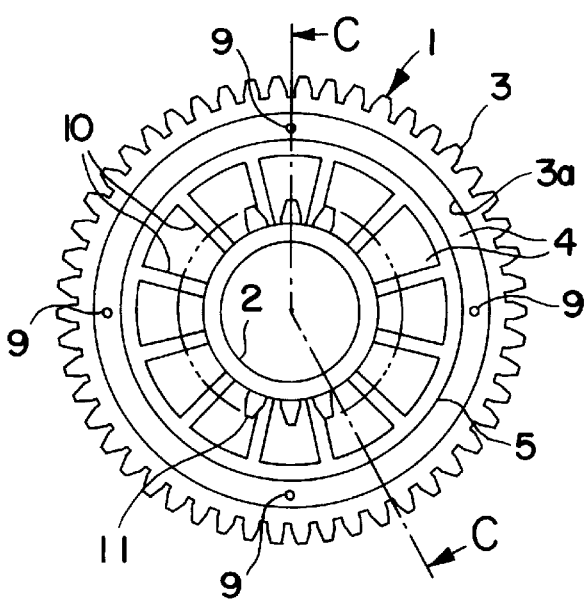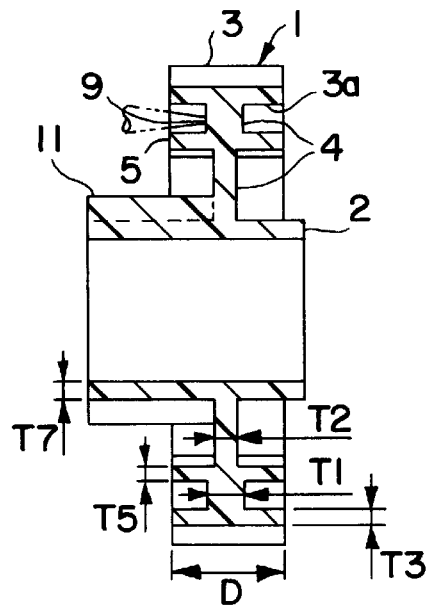
FIG. 3(a)  FIG. 3(b)

MOLD TYPE PLASTIC GEAR

FIELD OF THE INVENTION

This invention relates to mold type plastic gears which are of high accuracy and high rigidity.

BACKGROUND OF THE INVENTION

In general, in a mold type plastic gear having teeth along its circumference, a portion of its wall thickness must be removed when face width of said gear becomes over 2 mm. This is carried out for assuring the accuracy of gear. However, a simple wall-removed shape of a gear brings about a decrease of its rigidity and an increase of in the amount of deformation of the gear during meshing action, thereby reducing the gear performance For assuring the rigidity of mold type plastic gear which has undergone a thickness-removal operation, it is general to have some radial ribs connected to tooth root of teeth between hub of gear and said tooth root of teeth. However, shrinkage cavity of resin occurs at the connection between said tooth root and said ribs when forming the gear, thereby to considerably reduce the roundness of the gear.

Therefore, in place of connecting said ribs directly to said tooth root of teeth, another gear construction is proposed wherein a circular rim is formed at the distance from and inside of said tooth root and radial ribs are formed on the inside of said rim (refer to Japanese Patent Laid Open No. 96-25501). In such a gear construction, even if said ribs are connected to said rim, local shrinkage cavity of resin at teeth portion of gear can be prevented, thereby to assure rigidity of gear while maintaining its accuracy.

On the other hand, it is important that pressure against the gear, particularly against the teeth portion thereof is uniformly maintained until the last step of the forming process wherein the resin is cooled and solidified. When the circular rim is formed at a distance from tooth root, the gates are preferably located in the web portion on the inside of said rim. However, in this case, since said rim is located in the flowing route of the resin from said gates to said teeth portion, the cooling speed of the resin at respective portions of gear is affected and it becomes difficult to maintain uniform pressure particularly against the teeth portion of gear until the last step of forming operation.

Further, in the case of a composite gear having an outer teeth portion along its circumference as well as an inner teeth portion or mechanism such as cam around said hub, it is necessary to assure the rigidity of said outer teeth portion having a larger diameter and also to maintain pressure against said inner teeth portion or said mechanism around said hub which need a high accuracy until the last step of forming operation.

SUMMARY OF THE INVENTION

An object of the present invention is to provide a mold type plastic gears wherein the problem of pressure maintaining as described above is eliminated and high accuracy and rigidity are obtained.

For the purpose of eliminating the above mentioned problems, this invention delivers mold type plastic gear which has removed its wall portions on the inside of a tooth root of its circumferential gear teeth portion, said gear having a circular rim formed at a distance from and on inside of said tooth root, and said gear formed by injection of resin through gates located in a web portion on the inside of said rim, said gear being characterized in that thickness of said web portion on the inside of said rim is made larger than that of a web portion on the outside of said rim.

In mold type plastic gears having the above described construction, since its wall portions on the inside of said tooth root of its circumferential gear teeth portion has been removed and since a circular rim is formed at a distance from and on the inside of said tooth root, said teeth portion can be made more rigid by said circular rib while preventing a decrease of forming accuracy and a weight increase caused by increase of the width of the face of said gear. Therefore, the deformation caused in gear meshing can be held at a lower level, thereby to prevent a decrease of gear performance. Since the thickness of web portion on the inside of said rim is made larger than that of web portion on the outside of said rim, the region near said circumferential tooth root is cooled and solidified prior to the region near said gates located in the web portion on the inside of said rim, while at the same time said rim located between said teeth portion and said gates is cooled and solidified at an earlier stage of forming. Accordingly, mold type plastic gear having a higher forming accuracy can be obtained by uniformly maintaining pressure against said teeth portion until the last stage of forming operation.

Further, thickness of web on the outside of said rim is made approximately equal to or larger than thickness of said rim in said mold type plastic gear.

In the above construction, the region near said surrounding gear portion is cooled and solidified prior to the region near said gates located in the web portion on the inside of said rim at the forming operation of said gear while at the same time said rim located between said teeth portion and said gates is cooled and solidified at a further earlier stage of forming operation.

Further, thickness of said outer web on the outside of said rim is made approximately equal to or larger than that of said tooth root.

In this construction, region near said teeth portion is cooled and solidified prior to said web on the outer side of said rim, so that mold type plastic gear having a higher forming accuracy can be obtained by uniformly maintaining pressure against said teeth portion.

Further, a plurality of radial ribs are formed on said web portion on the inside of said rim, said ribs being connected to said rim, and thickness of said radial ribs is approximately equal to that of said rim.

In this construction, the circular rim for fortifying said circumferential teeth portion is made more rigid by a plurality of radial ribs so that gears having a higher rigidity can be obtained, while at the same time said ribs located in the web portion for said gates are cooled and solidified at an early stage of the forming operation so that a mold type plastic gear having a higher forming accuracy can be obtained by uniformly maintaining pressure against said teeth portion until the last stage of forming operation.

Further, according to the present invention, there is provided a mold type plastic gear which has removed its wall portions between a tooth root of circumferential gear teeth portion and a motion transferring mechanism formed around central hub, said gear having a circular rim formed at a distance from and on the inside of said tooth root, and said gear formed by injection of resin through gates located in a web portion on the inside or outside of said rim, said gear being characterized in that said web has its largest thickness in the region where said gates are located, and in that said rim has a thickness which is approximately equal to or smaller than the least thickness of said web.

In the above construction, since said wall portions between a tooth root of circumferential gear teeth portion and a motion transferring mechanism formed around a central hub have been removed and a circular rim is formed at a distance from and on the inside of said tooth root, said teeth portion can be made more rigid by said circular rim while preventing a decrease of forming accuracy and a weight increase caused by an increase of the width of the face of said gear. Therefore, the deformation caused in gear meshing can be held at a lower level, thereby to prevent decrease of gear performance. Further, since said web has its largest thickness in the region where said gates are located in the forming operation, and since said rim has a thickness which is approximately equal to or smaller than the least thickness of said web, a mold type plastic gear having a higher forming accuracy can be obtained by uniformly maintaining the pressure against said teeth portion and said motion transferring mechanism around said hub until the last stage of forming operation.

As it is clear from the above description, mold type plastic gear according to the invention is highly suitable for precision driving system of OA instruments such as printer or copying machine and the like because of its high accuracy and high rigidity.

BRIEF DESCRIPTION OF THE DRAWINGS

FIGS. 1(*a*) and (*b*) are respectively a front view and a cross sectional view taken on line A—A in FIG. 1 (*a*) of the first embodiment wherein the present invention is applied to a plastic spur gear used in a precision driving system such as printer or copying machine and the like;

FIGS. 2 (*a*) and (*b*) are respectively a front view and a cross-sectional view taken on line B—B in FIG. 2 (*a*), showing the second embodiment of the present invention; and FIGS. 3 (*a*) and (*b*) are respectively a front view and a cross-sectional view taken on line C—C in FIG. 3 (*a*), showing the third embodiment of the present invention.

DETAILED DESCRIPTION OF PREFERRED EMBODIMENTS

Embodiments of the present invention are described hereinbelow referring to the attached drawings, FIGS. 1–3.

Figure 1A:
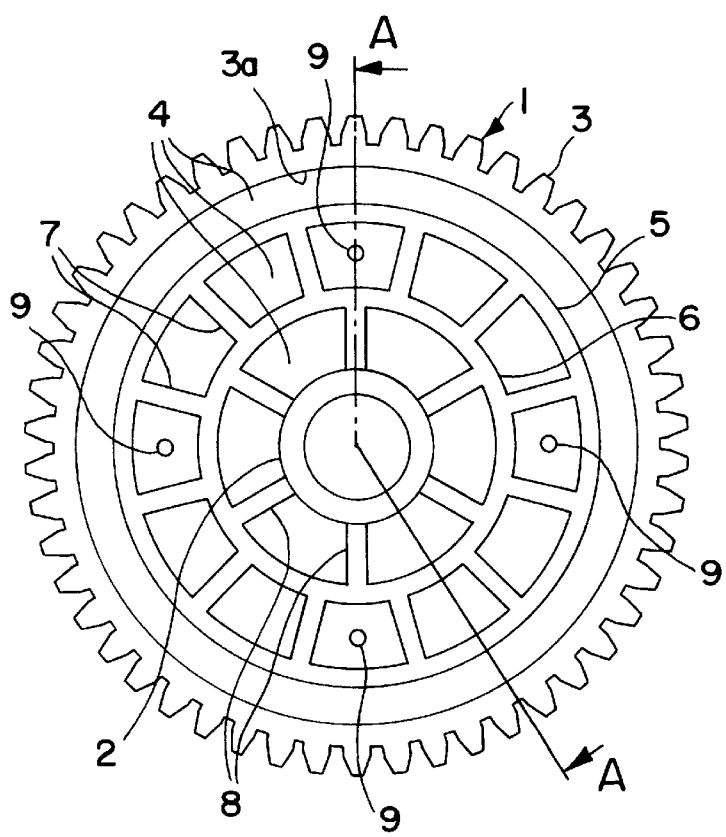
Figure 1B:
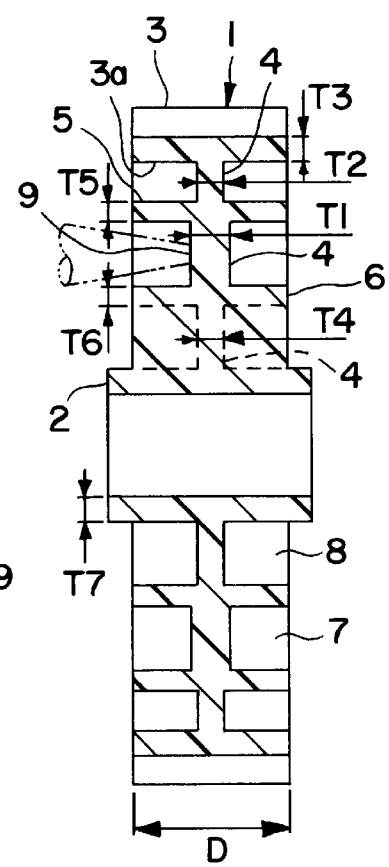

In the drawings, FIGS. 1 (*a*) and (*b*) show the first embodiment of the present invention which is applied on a spur wheel made from plastic materials and used in precision driving system such as printer and copying machine and the like, wherein FIG. 1 (*a*) is a front view thereof and FIG. 1 (*b*) is a cross-sectional view taken on line A—A in FIG. 1 (*a*).

Referring to the drawings, mold type plastic gear has a hollow hub 2 at its central portion and teeth portion 3 along its circumference, the intermediate wall portions of said hub 2 and teeth portion 3 being removed thereby to form a web 4. A circular rim 5 is formed at a distance from and on the inside of said tooth root 3*a* of said teeth portion 3, an another rim 6 being formed further inside of said rim 5. Further, a plurality of radial ribs 7 and 8 are formed respectively on said web 4 between said outside rim 5 and inside rim 6 and on said web 4 between said inside rim 6 and said hub 2.

Said mold type plastic gear 1 is formed by molten resin injected into cavity of a forming mold (not shown) through gates 9 as shown in FIG. 1. Said each gate 9 is located in web 4 between said outer rim 5 and said inner rim 6, so that molten resin flowing from respective gates 9 to said teeth portion 3 passes through said outer rim 5 which in this case act as a buffer against flowing molten resin, resulting in a uniform flow of molten resin from said rim 5 to said outer teeth portion 3.

Further, in this first embodiment, as shown in FIG. 1 (*b*), wall thickness T1 of web portion 4 on the inside of outer rim 5, i.e. between two rims 5 and 6, is made larger than wall thickness T2 of the outer web 4 which is located outside of said rim 5. Similarly, said thickness T2 of said outer web 4 on the outside of said rim 5 is made larger than the thickness T5 of said rim 5, and said thickness T2 is made approximately equal to or larger than thickness T3 of said tooth root 3*a* of teeth portion 3.

Further, in this first embodiment, thickness T6 of said inner rim 6 is made approximately equal to said thickness T5 of said outer rim 5, and thickness T4 of said web 4 on the inside of said rim 6 is made smaller than said thickness T1 of said outer web 4 on the outside of said rim 6 and larger than said thickness T6 of said inner rim 6. Lastly, thickness T7 of said hub 2 is made approximately equal to or smaller than said thickness T4 of said inner web 4 on the inside of said rim 6.

In this mold type plastic gear 1 having the construction as described above, wall portion on the inner side of said tooth root 3*a* of said teeth portion 3 is removed thereby to form said circular rim 5 on the inside of said tooth root 3*a* at a certain distance therefrom, so that said teeth portion 3 can be stiffened by said circular rim 5 while preventing decrease of forming accuracy and weight increase caused by increase of said face width D. Accordingly, degree of deformation caused in the meshing of said gear 1 can be reduced to at a low level thereby to prevent decrease of performance of said gear 1. Further, since thickness T1 of said web portion 4 on the inside of said rim 5 is made larger than thickness T2 of said web portion 4 on the outside of said rim 5, molten resin near said teeth portion 3 is cooled and solidified prior to the region near said gates 9 located in said web portion 4 on the inner side of said rim 5 while at the same time said rim 5 located between teeth portion 3 and said gates 9 is cooled and solidified at an earlier stage. Further, in this embodiment, said thickness T2 of said outer web portion 4 on the outside of said rim 5 is made larger than said thickness T5 of said rim 5, so that in the forming of said gear, molten resin near said tooth root 3*a* is cooled and solidified prior to molten resin near said gates 9 located in said web portion 4 on the inside of said rim 5 while at the same time said rim 5 located between said teeth portion 3 and said gates 9 can be cooled and solidified in an earlier stage.

Consequently, pressure against teeth portion 3 can be maintained until the last forming step, thereby to provide said mold type plastic gear 1 having a higher forming accuracy, in particular a higher roundness.

Further, in the construction of the above first embodiment, the region near said teeth portion 3 is cooled and solidified prior to web portion 4 on the outside of said rim 5 in the forming operation of gear 1, so that said teeth portion 3 can be more uniformly pressurized thereby to obtain a higher forming accuracy.

Further, in the construction of the above first embodiment, since said circular rim 5 for fortifying said teeth portion 3 is made more rigid by a plurality of radial ribs 7, thereby to provide gear 1 having a higher rigidity. Further, said ribs 7 located on said webs 4 where said gates 5 are located are cooled and solidified in an earlier stage of forming operation, thereby to maintain pressure against said gear portion 3 until the last stage of forming operation and thus to provide said mold type plastic gear 1 having a higher forming accuracy.

FIGS. 2 (a) and (b) show the second embodiment of the present invention, wherein same components as those in above described embodiment are marked with the same numbers.

In the mold type plastic gear 1 of the second embodiment shown in FIGS. 2 (a) and (b), a plurality of radial ribs 10 are formed on web 4 between a circular rim 5 formed on the inside of teeth portion 3 and a hub 2 for connecting said rim 5 and said hub 2.

As shown in FIG. 2 (b), thickness T1 of web portion 4 on the inside of said rim 5 is made larger than thickness T2 of web portion 4 on the outside of said rim 5, and said thickness T2 of web portion 4 on the outside of said rim 5 is made larger than thickness T5 of said rim 5. Further, said thickness T2 of web portion 4 on the outside of said rim 5 is made approximately equal to or larger than thickness T3 of tooth root 3a of said teeth portion 3. Further, thickness T7 of said hub 2 is made approximately equal to or smaller than said thickness T1 of said web portion 4 on the inside of said rib 5.

Consequently, this second embodiment can provide a mold type plastic gear 1 having a high accuracy and a high rigidity similar to those in the first embodiment.

FIGS. 3 (a) and (b) show the third embodiment of the present invention, wherein same components as those in above described first and second embodiments are marked with the same numbers.

With reference to these FIGS. 3 (a) and (b) showing a mold type plastic gear 1 of the third embodiment according to the invention, the wall portion between its tooth root 3a of its teeth portion 3 formed around the circumference of said gear 1 and teeth portion 11 formed around central hub 2 and taking a role as a rotation power transmission mechanism is removed, and a circular rim 5 is formed at a distance from and inside of said tooth root 3a of teeth portion 3. A plurality of radial ribs 10 are formed between said rim 5 and said hub 2. Said gear 1 having such a construction is formed by injection of resin through gates 9 located in said web 4 on the inner side or outer side (as shown in FIG. 3) of said rim 5. Said web 4 has a largest thickness T1 in the portion thereof where said gates 9 are located. Said tooth root 3a of surrounding teeth portion 3 and said hub 2 have respectively thickness T3 or T7 which is approximately equal to or smaller than the least thickness T2 of said web 4. Further, said rim 5 has a thickness T5 which is smaller than the least thickness T2 of said web 4.

More specifically, in the third embodiment shown in FIG. 3 (b), thickness T1 of said outer web portion 4 on the outside of said rim 5 is made larger than thickness T2 of said inner web portion 4 on the inside of said rim 5; said thickness T2 of said inner web portion 4 on the inside of said rim 5 is larger than thickness T5 of said rim 5; said thickness T2 of said inner web portion 4 on the inside of said rim 5 is made approximately equal to or larger than thickness T3 of said tooth root 3a of said teeth portion 3; and thickness T7 of said hub 2 is made approximately equal to or smaller than said thickness T2 of said inner web portion 4 on the inside of said rib 5.

In the third embodiment according to the invention, the wall portion between its tooth root 3a of its teeth portion 3 formed around the circumference of said gear 1 and teeth portion 11 (i.e., motion transmitting mechanism ) formed around central hub 2 is removed, and a circular rim 5 is formed at a distance from and inside of said tooth root 3a of teeth portion 3, so that said teeth portion 3 can be fortified by said circular rib 5 while preventing a decrease of the forming accuracy and a weight increase caused by an increased gear face width. Therefore, the deformation caused in the meshing of the gear can be maintained at a lower level, thereby to prevent the decrease in gear performance. Further, since said web 4 has its largest thickness T1 in the region where said gates 9 are located, and since said rim 5 has a thickness T5 which is smaller than the least thickness T2 of said web 4, pressure against surrounding teeth portion 3 and teeth portion 11 (i.e., motion transmitting mechanism) formed around hub 2 is maintained up to the final step of gear forming, thereby providing a mold type plastic gear having a high forming accuracy.

Further, in addition to said teeth portion, circumferential cam, pulley, worm and the like can be used for motion transmitting mechanism formed around said hub 2.

Although the present invention has been descried with reference to the embodiments shown in the accompanying drawings, it is not limited thereto, in that the number of rims, ribs and gates for example can be suitably selected when necessary. Further, as shown in FIGS. 1 (b) and 2 (b), wall portions between rim and hub are removed symmetrically in the axial direction, but these wall portions can be non-symmetrically removed. Further, said teeth portion formed along the circumference of gear are not limited to those of spur gear, but said teeth portion may take the form of bevel gear or helical gear for example.

Further, in the above described three embodiments of gear thickness of rim is made smaller than that of web portion having the least thickness. However, said thickness of rim may be made approximately equal to said least thickness of web, provided that the construction of gear satisfies the following conditions; the region near said teeth portion is cooled and solidified prior to the region of said gates and said rim can be cooled and solidified in an earlier stage in the gear forming operation.

Further, ribs having a thickness causing no problem in the forming accuracy and thinner than said rim 5 may be located radially on said web 4 between said tooth root 3a of said surrounding gear 3 and said rim 5, thereby to connect said tooth root 3a and said rim 5 with said radial ribs. In this case, it is preferable to locate said radial rib portions on the outer and inner side of said rim 5 respectively in a staggered position in the circumferential direction.

What is claimed is:

1. A molded plastic circular gear which has removed its wall portions on an inside of a tooth root of its circumferential gear teeth portion, said gear having a circular rim formed at a distance from and on the inside of said tooth root, and wherein said gear includes gates located in a web portion on the inside of said rim for injecting resin in a molding process, said gear being characterized in that a thickness in an axial direction of at least a part of said web portion which is on the inside of said rim and extends from said gates to said circular rim is made larger than that of a web portion on an outside of said rim.

2. The molded plastic circular gear as claimed in claim 1, characterized in that thickness in an axial direction of said web portion on the outside of said rim is at least equal to that of said tooth root of said teeth portion.

3. The molded plastic circular gear as in claim 1 or 2, characterized in that a plurality of radial ribs are formed on said web portion on the inside of said rim, said ribs being connected to said rim.

4. The molded plastic circular gear as claimed in claim 3, characterized in that thickness in an axial direction of said radial ribs is substantially equal to that of said rim.

* * * * *

UNITED STATES PATENT AND TRADEMARK OFFICE
CERTIFICATE OF CORRECTION

PATENT NO. : 6,070,484
DATED : June 6, 2000
INVENTOR(S) : Kazuyuki Sakamaki

It is certified that error appears in the above-indentified patent and that said Letters Patent is hereby corrected as shown below:

Item [30] Foreign Application Priority Data:

Add --Apr. 3, 1997 [JP] Japan ....... 9-100987--

Signed and Sealed this

Eighth Day of May, 2001

*Attest:*

NICHOLAS P. GODICI

*Attesting Officer*   Acting Director of the United States Patent and Trademark Office